Oct. 7, 1952        A. R. BURCH        2,613,084
WHEEL AND TIRE LIFTER
Filed Dec. 17, 1948        2 SHEETS—SHEET 1
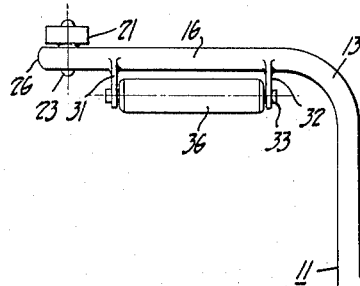
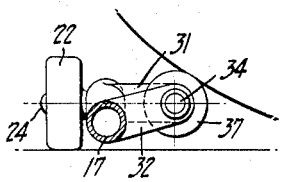
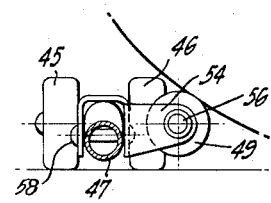
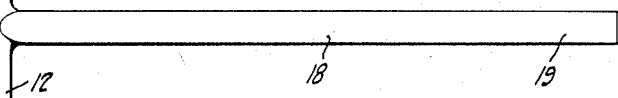
FIG_1_    FIG_2_    FIG_6_
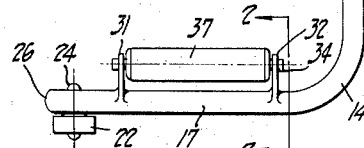
FIG_3_
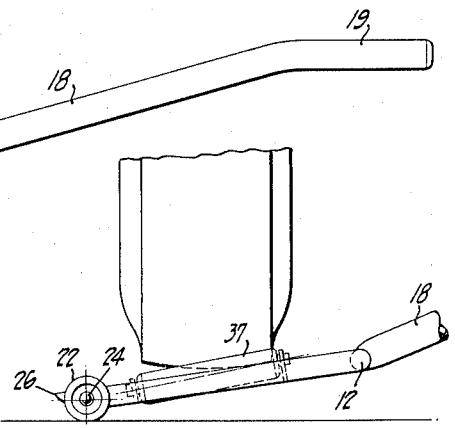
FIG_4_
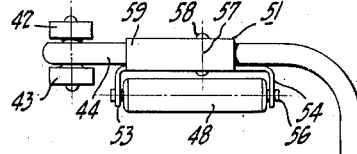
FIG_5_
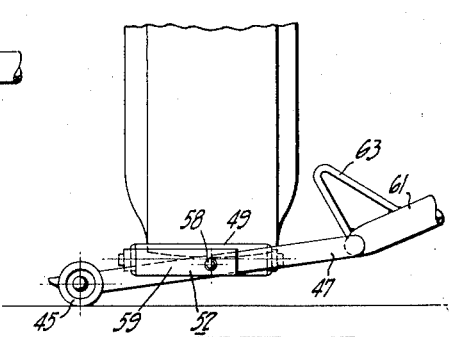
FIG_8_
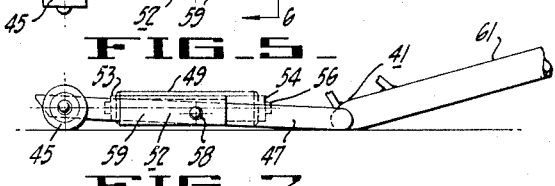
FIG_7_
INVENTOR.
Arthur R. Burch
BY Oct. 7, 1952  A. R. BURCH  2,613,084
WHEEL AND TIRE LIFTER
Filed Dec. 17, 1948  2 SHEETS—SHEET 2
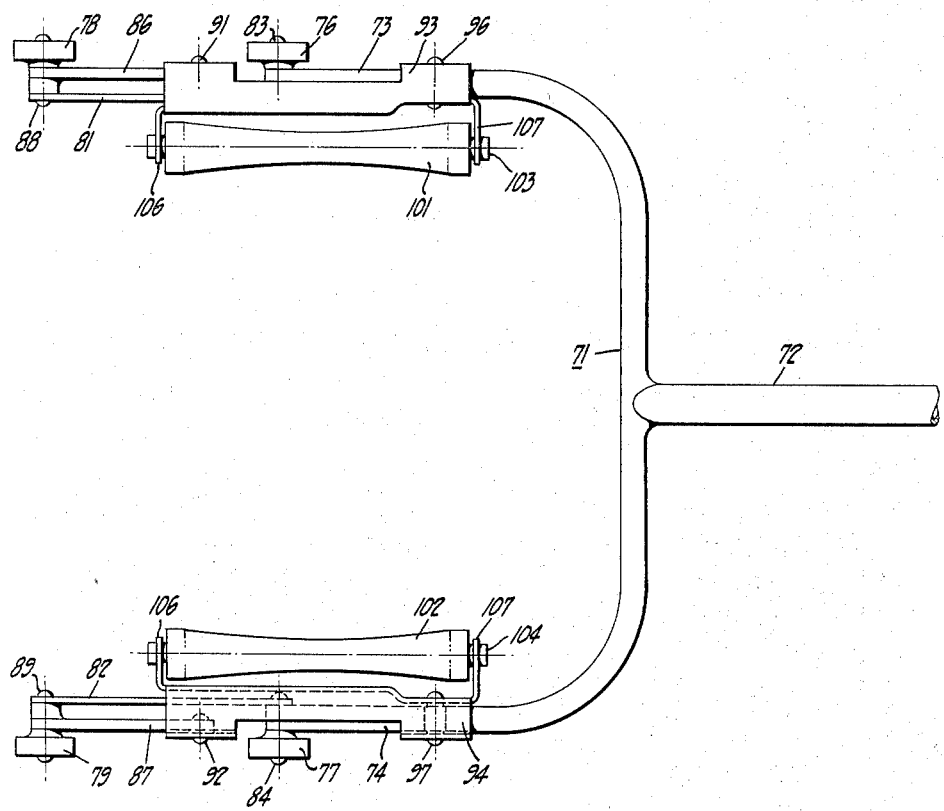
FIG_9_
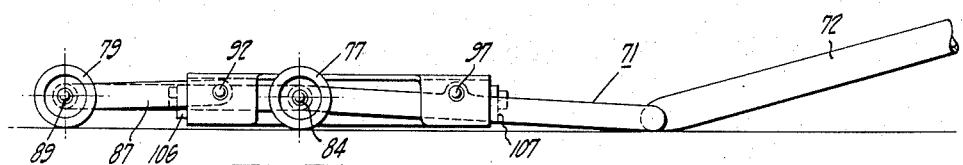
FIG_10_
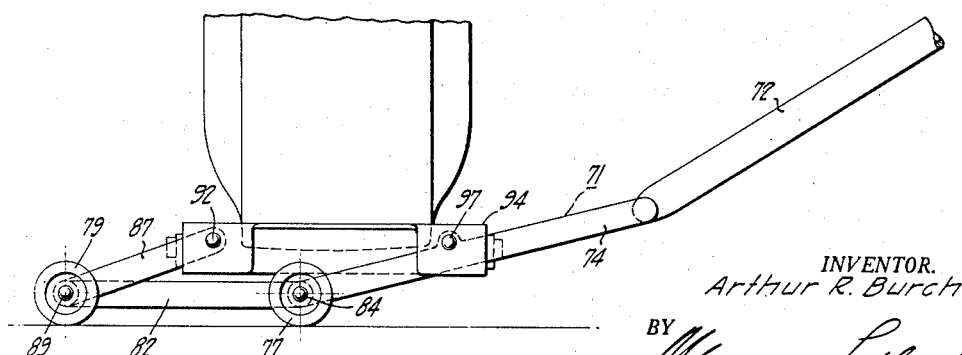
FIG_11_
INVENTOR.
Arthur R. Burch
BY Patented Oct. 7, 1952

2,613,084

UNITED STATES PATENT OFFICE 2,613,084

WHEEL AND TIRE LIFTER

Arthur R. Burch, Berkeley, Calif.

Application December 17, 1948, Serial No. 65,779

2 Claims. (Cl. 280—53)

My invention relates to means for assisting a workman to handle a relatively heavy load and is concerned particularly with a structure for his use in mounting and demounting automobile wheel and tire assemblies on their respective axle or wheel mountings.

While removal of a tire and wheel section from a moderate size structure is not particularly difficult, the operation becomes difficult and onerous when the tire and associated rim and wheel are of considerable size and correspondingly great weight. For example, truck and aircraft tires often weigh so much that it is difficult for one man alone to handle them at all. In addition, while the demounting itself is hard enough, the reassembly of a tire and wheel with its appropriate axle is even harder because not only must the lifting be effectuated, but the assembly must be rather accurately positioned in order to engage the mounting and driving lugs normally provided. Various structures to assist the operator or user in these operations have been proposed, but in many of them there is either so much mechanism that they themselves are not readily and easily carried about by an operator or their use involves motions of the user which are awkward and do not assist but rather increase the difficulty in making the desired change.

It is therefore an object of my invention to provide a wheel and tire lifter mechanically quite simple and light and readily portable so that a user can put it into operation easily.

Another object of my invention is to provide a wheel and tire lifter effective to handle quite heavy loads.

Another object of my invention is to provide a wheel and tire lifter in which the user's motions in employing the device assist rather than hamper the operation.

A further object of the invention is to provide a wheel and tire lifter useful in connection with different sized wheels and tires interchangeably within wide limits and also useful for handling other heavy objects.

Other objects together with the foregoing are attained in the following description of the invention and illustrated in the accompanying drawings in which Figure 1 is a plan of one form of wheel and tire lifter constructed in accordance with my invention.

Figure 2 is a detailed cross-section, the plane of which is indicated by the line 2—2 of Figure 1.

Figure 3 is a side elevation of the structure shown in Figure 1.

Figure 4 is a fragmentary side elevation of the Figure 1 device shown in an operative position.

Figure 5 is a plan of a second form of wheel and tire lifter constructed in accordance with my invention.

Figure 6 is a cross-section, the plane of which is indicated by the line 6—6 of Figure 5.

Figure 7 is a side elevation of the structure of Figure 5.

Figure 8 is a fragmentary side elevation showing the Figure 5 structure in operative relationship with a tire.

Figure 9 is a plan of a third form of wheel and tire lifter in accordance with my invention.

Figure 10 is a side elevation of the Figure 9 structure.

Figure 11 is a side elevation of the Figure 9 structure in lifted position.

In its preferred form, the wheel and tire lifter of my invention comprises a frame forked at one end to provide a pair of tines at their extremities carrying ground-engaging members, such as wheels. At the other end of the frame there is afforded a handle for grasping by the user. Between the ground-engaging wheel and the handle and preferably near the wheels, I provide on the tines of the forked member wheel-engaging or supporting rollers arranged to be lifted into engagement with a wheel and to lower with the wheel about the ground-engaging members as a fulcrum.

While the wheel and tire lifter of my invention is readily embodied in numerous different forms, partially depending upon the particular environment in which it is principally to be utilized, it has been successfully embodied in the several forms illustrated herein.

First with reference to the form shown in Figures 1 to 4 inclusive, there is provided a frame generally designated 11 and preferably constituted by a tubular cross bar 12 at its ends bent into curves 13 and 14 to afford two parallel tines 16 and 17 extending in the same direction away from the cross bar 12 and forming a forked member. Between the ends of the cross bar 11 and preferably disposed in the middle or substantially centrally thereof is a tube 18 also included in the framework 11 and extending to a convenient point where it is bent to afford a grip or handle 19 at a suitable location and of a suitable size to be grasped by the operator's hand.

The opposite extremities of the framework; namely, the ends of the tines 16 and 17, are preferably provided with ground-engaging members in the nature of relatively small wheels 21 and 22 rotatably mounted on axles 23 and 24 arranged in alignment transversely of the framework 11 or parallel to the cross bar 12. The wheels 21 are normally sufficient to maintain the framework 11 spaced from the supporting surface but the framework is also extended and provided with beveled ends 26 so that when the framework is disposed in a substantially upright condition, the wheels 21 and 22 are lifted from the support or floor and the weight of the entire assembly can rest stably upon the ends 26.

Preferably the tines 16 and 17, although parallel to each other are not quite parallel to the handle 19 so that the cross bar 12 forms another ground-engaging portion of the framework 11, especially as illustrated in Figure 3. In this position of the device, the handle 19 is spaced a convenient distance above the floor while the tines 16 and 17 are sufficiently low to ride upon the wheels 21 and 22 underneath a tire and wheel assembly to be moved.

To engage the tire of such assembly, I provide on each of the tines 16 and 17 a pair of inwardly projecting arms 31 and 32, respectively, which carry parallel shafts 33 and 34. On the shafts are rotatably mounted rollers 36 and 37 so that when the tire is supported upon the rollers, the tire itself can readily be revolved about its own axis.

When the rollers 36 and 37 have been positioned under a mounted tire with the structure in its lowermost or flat position, substantially shown in Figure 3, the user by lifting upon the handle 19 causes the entire framework 11 to fulcrum about the axis of the ground engaging wheels 21 and 22 until the wheel-engaging rollers 36 and 37 are in contact with the tire. Then, further movement of the handle 19 upwardly toward the tire causes a lifting action so that the weight of the tire is transferred to the support of the rollers 36 and 37. As soon as it is free from its fastenings, the entire wheel assembly can then, with the handle 19 raised, be moved along on the wheels 21 and 22. The user during this time stands with one hand on the handle 19 and with his other supporting or bracing the upper portion of the tire resting on the rollers 36 and 37. Since the handle moves toward the tire as the tire is being lifted, the user is in a position to steady and brace the tire. This is in contradistinction to some previous devices in which, as the tire weight is shifted to the auxiliary supporting device, the user gets farther and farther away from his vantage point.

In restoring a tire to the wheel, the reverse operation takes place in that the tire mounted on the rollers 36 and 37, with the handle 19 held in raised position by the user, is wheeled into place. It is accurately located upon the mounting studs or members since the user has one hand at the top of the tire and the other in raised or approached position on the handle 19. Then after the wheel and tire have been appropriately located, the handle 19 is lowered and the tire weight is shifted from the auxiliary tool to its normal supporting members. Following that, the handle 19 is withdrawn and the mechanism rolls back on the wheels 21 and 22 and can be left against a wall or in a corner resting upon the tips 26.

The form of the device shown in Figure 1 is almost of elementary simplicity, and while it is entirely satisfactory for most purposes, it is improved upon in the case of very heavy units by the slight modifications in construction in the form shown in Figures 5 to 8 inclusive. In this form, while the framework 41 is substantially as previously described, ground engaging wheels 42 and 43 near the terminal of the tine 44 are aligned on opposite sides of the tine in order to provide a balanced support. A similar pair of wheels 45 and 46 are disposed adjacent the end of the other tine 47.

Instead of the supporting arms 31 and 32 being rigidly fastened to the tines, however, the rollers 48 and 49 are supported on rocking frameworks 51 and 52, respectively. These are identical and each of them is provided with a pair of arms 53 and 54 which engage the shaft 56 passing through the respective one of the tire-engaging rollers. Each rocking framework is also pivoted about a transverse axis 57 by a pin 58 passing through the material of the adjacent tine. Furthermore, the pivotal axis 57 is not quite concentric or symmetrical with respect to the rocking framework 51 which in addition is provided with an eccentric extension 59 so that normally the unbalanced weight of the roller and rocking framework assembly causes the roller to incline toward and into contact with the leading portion of the main framework 41.

When the handle 61 of the structure is lowered and the framework is moved along into or away from operating position, the rollers 48 and 49 are automatically then held in approximately a horizontal attitude so that they slip in under or out from the wheel tire easily. When the handle 61 is swung up or down, the weight of the tire upon the rollers 48 and 49 causes a pivotal motion of the rollers about the axis 57 and the tire is readily maintained in substantially a vertical plane by the operator's other hand as the handle 61 is moved. The ratio of leverages about the fulcrum is maintained substantially constant. A positioning stop 63 can be provided on the framework 41 as an aid in locating the structure which otherwise operates approximately as described in connection with the first device of Figures 1 to 4 inclusive.

In other instances where the load may be very heavy indeed, and particularly where the load may be quite eccentric with respect to the mounting wheel or is very wide, for example, in the case of airplane tires, I have provided a further modified form of wheel and tire lifter substantially as shown in Figures 9 to 11, inclusive. In this instance a framework 71 is provided with a handle 72, substantially as before, and is formed with tines 73 and 74 constituting a fork. The lowermost or outermost ends of the fork tines 73 and 74 are provided with ground-engaging wheels 76 and 77 respectively. These alone, however, are not relied upon solely to support the entire weight.

Auxiliary ground-engaging wheels 78 and 79 are disposed at the ends of links 81 and 82, which at their rearmost ends are pivoted on the axles 83 and 84 of the wheels 76 and 77 respectively. Furthermore, additional links 86 and 87 are pivoted to the axles 88 and 89 of the wheels 78 and 79 and in their own turn are connected by pivots 91 and 92 to the respective one of a pair of frameworks 93 and 94, which at their rearward ends are connected by pivots 96 and 97 to the tines 73 and 74. The locations of the various pivots 84, 89, 92, and 97, for example, are such that a parallelogram linkage is formed and one in which the points are so located that when the device is in its lowermost position, Figure 10, a lifting motion of the handle 72 causes the main framework 71 to pivot about the axis of the wheels 76 and 77 to erect the parallelogram linkage and to lift the frameworks 93 and 94 in a parallel or planar or horizontal relationship. Mounted on the frameworks are concave rollers 101 and 102 respectively journaled on shafts 103 and 104 mounted in the parallel arms 106 and 107 projecting from the frameworks.

In the use of this device, when the handle 72 is lowered, the mechanism is substantially flat and is rolled in under the tire and wheel assembly. Then when the handle 72 is lifted toward the tire by the operator, the rollers 101 and 102 are lifted in a substantially planar or parallel position until they engage the tire and wheel and assume its weight as it is being braced by the operator's other hand. The tire and wheel can then be removed to any convenient point. In restoring the parts, the reverse series of motions is followed.

I claim:

1. A wheel and tire lifter comprising a frame having a fork at one end to provide a pair of tines, ground engaging wheels on said frame at said end, a handle at the other end of said frame, a pair of rocking frameworks each including a channel straddling one of said tines, a pair of arms affixed to each of said channels and extending inwardly of said frame, a tire-supporting roller journaled between each of said pairs of arms, and pivots passing eccentrically through said channels and said tines an intermediate portion of said frame between said ground engaging wheels and said handle.

2. A wheel and tire lifter comprising a frame including a cross-bar and a pair of tines extending in one direction from the ends of said cross-bar and a handle extending in the opposite direction from said cross-bar, ground-engaging members at the ends of said tines, movable frameworks pivoted on said tines at a position between said ground-engaging members and said handle, each of said movable frameworks including a support straddling one of said tines, arms extending from the ends of each support in a direction inwardly of said frame and wheel-supporting rollers journaled on said arms.

ARTHUR R. BURCH.

REFERENCES CITED

The following references are of record in the file of this patent:

UNITED STATES PATENTS

| Number | Name | Date |
|---|---|---|
| 2,135,802 | Dinkins | Nov. 8, 1938 |
| 2,345,458 | Caron | Mar. 28, 1944 |
| 2,417,644 | Graham | Mar. 18, 1947 |
| 2,470,685 | Brown | May 17, 1949 |
| 2,471,051 | Tway | May 24, 1949 |